United States Patent
Joch

(10) Patent No.: US 11,509,558 B2
(45) Date of Patent: Nov. 22, 2022

(54) ESTIMATING NETWORK LATENCY FOR TRAFFIC TRANSPORTED WITH ENCRYPTED INTERNET TRANSPORT PROTOCOL

(71) Applicant: Tektronix Texas, LLC

(72) Inventor: Anthony Peter Joch, Waterloo (CA)

(73) Assignee: Tektronix Texas, LLC, Plano, TX (US)

( * ) Notice: Subject to any disclaimer, the term of this patent is extended or adjusted under 35 U.S.C. 154(b) by 0 days.

(21) Appl. No.: 17/226,468

(22) Filed: Apr. 9, 2021

(65) Prior Publication Data

US 2022/0329508 A1 Oct. 13, 2022

(51) Int. Cl.
*H04L 43/0864* (2022.01)
*H04L 43/0817* (2022.01)
*H04L 43/0882* (2022.01)
*H04L 43/16* (2022.01)

(52) U.S. Cl.
CPC ...... *H04L 43/0864* (2013.01); *H04L 43/0817* (2013.01); *H04L 43/0882* (2013.01); *H04L 43/16* (2013.01)

(58) Field of Classification Search
CPC ............ H04L 43/0864; H04L 43/0882; H04L 43/0817; H04L 43/16
See application file for complete search history.

(56) References Cited

PUBLICATIONS

Author: Oudah et al. Title: "Using Burstiness for Network Applications Classification" Year: 2019 Publisher: Hindawi (Year: 2019).*
Author: R. Krzanowski Title: "Burst (of packets) and Burstiness" Year: 2006 Publisher: 66th IETF—Montreal, Quebec, Canada (Year: 2006).*
Author: Mehdi Kharrazi et al. Title: "Towards Real-Time Performance Monitoring for Encrypted Traffic" Publisher: ACM Edition: INM'07, Aug. 27-31, 2007, Kyoto, Japan (Year: 2007).*
Author: Jianbin Wei et al. Title: "Measuring Client-Perceived Pageview Response Time of Internet Services" Publisher: IEEE Transactions on Parallel and Distributed Systems, vol. 22, No. 5 Digital Object Identifier No. 10.1109/TPDS.2010.131. (Year: 2011).*

(Continued)

*Primary Examiner* — John A Follansbee
*Assistant Examiner* — Kamal M Hossain
(74) *Attorney, Agent, or Firm* — Locke Lord LLP; Scott D. Wofsy; Christopher J. Capelli

(57) ABSTRACT

A method of estimating network latency including receiving intercept data (representing observations of requests sent by a client node and responses to the respective requests from a host node), detecting a burst of network traffic bounded by a first idle interval and/or second idle interval, and estimating download and/or upload latencies associated with the burst, wherein the download latency is estimated to be an amount of time between observation of an inferred first request of the burst from the client node until observation of a first response from the host node following the inferred first request, and the upload latency is estimated to be an amount of time between observation of a last inferred data packet of the burst from the host node to the client node until observation of a last inferred ACK packet from the client node following the last inferred data packet from the host node.

20 Claims, 5 Drawing Sheets

(56) References Cited

PUBLICATIONS

Kharrazi, M., et al., "Towards Real-Time Performance Monitoring for Encrypted Traffic," AT&T Labs—Research, Florham Park, NJ, 07932 {mkharrazi,sen} spatschl@research.att.com INM'07, Aug. 27-31, 2007, Kyoto, Japan. Copyright 2007 ACM 978-1-59593-788-9/07/0008.

* cited by examiner

ESTIMATING NETWORK LATENCY FOR TRAFFIC TRANSPORTED WITH ENCRYPTED INTERNET TRANSPORT PROTOCOL

BACKGROUND

1. Field of the Disclosure

The present disclosure relates to monitoring network traffic, and more particularly to estimating network latency for traffic transported with an encrypted internet transport protocol.

2. Description of Related Art

Network latency is defined as an amount of time for a network packet to travel from a sending endpoint to a receiving endpoint. Network latency is a key performance determinant for quality of flow of network traffic. High latency can adversely affect the speed of bulk transfers as well as quality of a network user's experience when using an interactive application, such as a real-time communications or cloud gaming application.

A network probe associated with a network can estimate the latency in the directions towards each of the endpoints involved in a network flow, wherein network flow refers to a high-level set of communications between end points that is bounded by an opening and closing of a session or conversation. Designating one endpoint as a "client node" and another as a "host node," when the client node sends a packet to the host node to which the host node responds, the network probe can measure download (DL) latency as a time at which the network probe observes a packet sent from the client node until a time the network probe observes the a packet of the host node's response. Similarly, the network probe can measure upload (UL) latency as a time at which the network probe observes a packet sent from the host node until a time the network probe observes a packet of the client node's response.

For many years, transport control protocol (TCP) protocol has been used for transmission of network traffic. TCP uses byte sequence numbers (SEQs) and acknowledgements (ACKs) of reception of those SEQs, which could be observed, unencrypted, by a network probe observing network traffic. This observation of SEQ and ACK values in the transport layer of the network flows permits accurate estimation of latency in TCP network flows.

In an emerging trend, network traffic is transported using an encrypted transport protocol for communicating between networks (e.g., via the Internet), such as QUIC protocol. For example, QUIC protocol is implemented on top of user datagram protocol (UDP) and implements encryption by default. Encryption of the information about which bytes in a network flow have been sent and acknowledged causes this information to be unavailable to an interception device When an encrypted transport protocol is used, the only network traffic of a network flow that is unencrypted and visible to the interception device may be handshake packets exchanged during an initialization phase. Accordingly, a network monitor analyzing information provided by interception devices no longer has the capability to determine accurate latency estimates based on identification of packets sent and acknowledged (e.g., by identifying and analyzing SEQ and ACK packets and accessing values in the packets), as was possible using an unencrypted network transport protocol, such as TCP, other than during the initialization phase when handshake packets (e.g. Client Hello, Server Hello, when using QUIC protocol) are identifiable to interception devices.

However, it is desirable to measure the latency on an ongoing basis throughout the lifetime of a network flow, which can include long-lived network flows (e.g. lasting several minutes or more), since the latency may change significantly throughout the lifetime of the network flows. Such long-lived network flows are common in video streaming, social networking and other applications.

Because of this limited visibility into the latency of network flows and the desire to measure it on an ongoing basis throughout a network flow, the concept of a "latency spin bit" was introduced into the IETF QUIC draft specification to enable latency monitoring from a mid-network probe throughout the duration of a QUIC connection. When in use, the spin bit within each QUIC connection should change value in each direction once per round trip, permitting estimation of the network latency. A QUIC connection refers to a single network flow between two endpoints that include several network-based communications between the endpoints.

However, the spin bit is not required to be enabled and, in fact, is disabled by default and only functions when enabled explicitly by each endpoint in a QUIC connection. Currently available examples of QUIC traffic from multiple major Internet-based services demonstrate that the spin bit is not being enabled (meaning it is not toggled per-round-trip). Hence, the spin bit cannot be relied upon for providing visibility into network latency.

While conventional methods and systems have generally been considered satisfactory for their intended purpose, there is still a need in the art for network monitoring systems to provide visibility into network latency at various points during a network flow transported using an encrypted transport protocol between networks.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of estimating network latency in network traffic between a client node and a host node of a network. The method includes receiving intercept data from an intercept device, wherein the intercept data represents observations of one or more requests sent by the client node and one or more responses to the respective requests from the host node. The method further includes detecting a burst of network traffic, wherein detecting the burst of network traffic is based on the burst of network traffic being preceded by a first idle interval and/or followed by a second idle interval. The method further includes estimating at least one of download (DL) and upload (UL) latencies associated with the burst, wherein the DL latency is estimated to be an amount of time between observation of an inferred first request of the burst from the client node until observation of a first response from the host node following the inferred first request, and the UL latency is estimated to be an amount of time between observation of a last inferred data packet of the burst from the host node to the client node until observation of a last inferred ACK packet from the client node following the last inferred data packet from the host node.

In one or more embodiments, the method can include estimating both the DL and UL latencies, and the method can further include estimating round-trip time (RTT) based on the estimated DL and UL latencies.

In one or more embodiments, the method can further include detecting the first and second idle intervals based on at least one of a duration of network traffic being idle satisfying a duration condition and a size of a first packet upon resumption of the network traffic after being idle satisfying a size condition.

In one or more embodiments, the duration condition can be based on exceeding a user-selectable duration or a duration that is a function of one or more previously determined RTTs.

In one or more embodiments, the first inferred request can be the first packet of resumed network traffic following the first idle interval.

In one or more embodiments, the first response can be the first inferred ACK packet or inferred data packet following the inferred request.

In one or more embodiments, the last inferred ACK packet can be the last packet of the burst from the client node that is inferred to be an ACK packet.

In one or more embodiments, the last inferred data packet can be a packet from the host node that immediately precedes the last inferred ACK packet and can be inferred to trigger the last inferred ACK packet.

In one or more embodiments, the method can further include post-processing the estimated DL and/or UL latencies, which can include at least one of filtering the estimated DL and/or UL latencies based on their relative size, and estimating a delay by which ACK packets are consistently delayed and adjusting the estimation of the DL and/or UL latencies to compensate for the estimated delay.

In accordance with aspects of the disclosure, a computer system is provided that performs the disclosed method. In accordance with further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
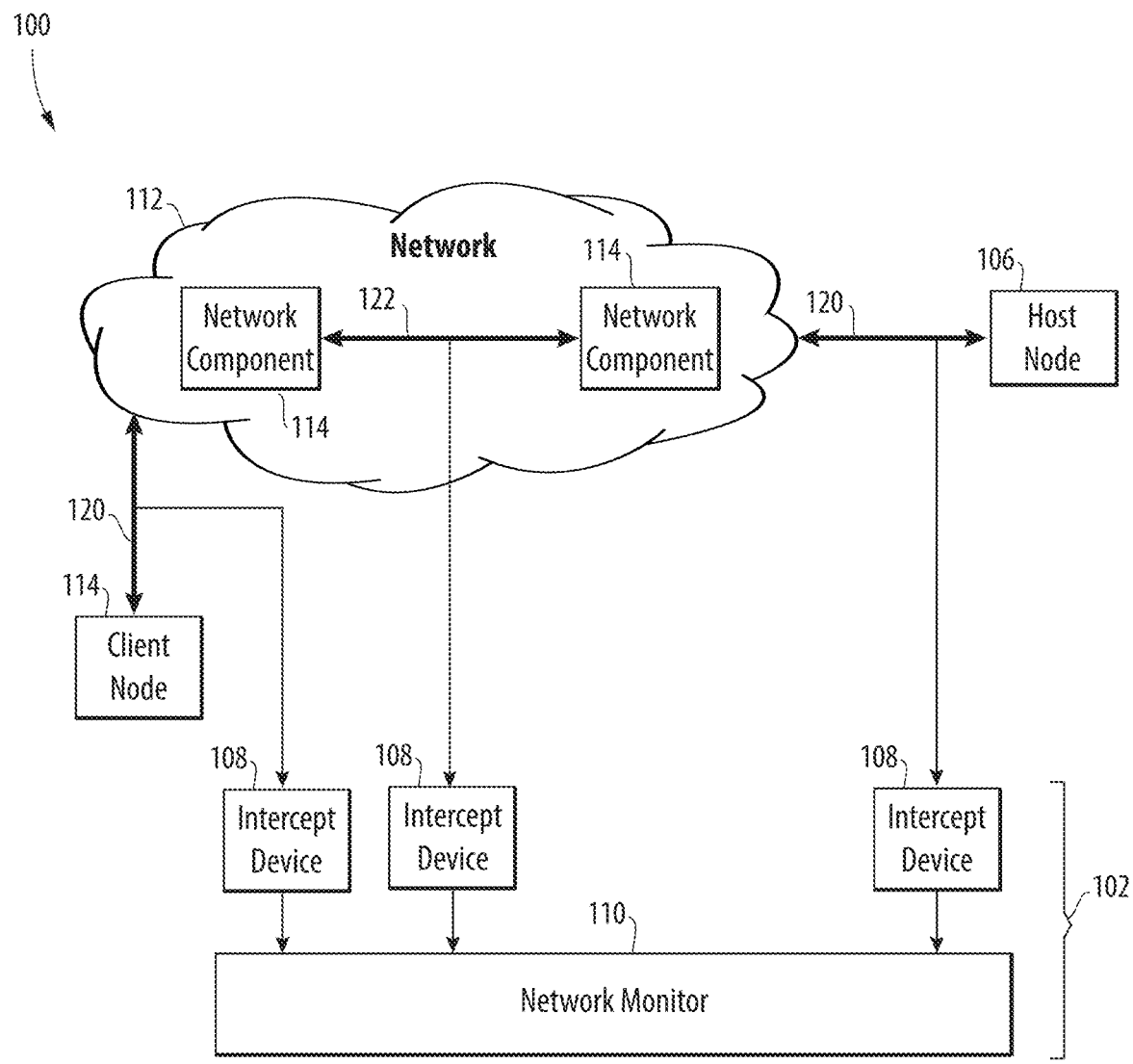
FIG. 1 illustrates a block diagram of an example network system having a network monitor for estimating download and/or upload latencies, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system 100 in accordance with the disclosure is shown in FIG. 1 and is designated generally by reference character 100. Methods associated with monitoring operations associated with a protected network of the network system 100 in accordance with the disclosure, or aspects thereof, are provided in FIGS. 2-5, as will be described. The systems and methods described herein can be used to provide automatic detection of malicious URI fragments, such as to allow mitigation of threats from network traffic having malicious URI fragments.

With reference now to FIG. 1, network system 100 includes a network monitor system 102 that monitors network communication between a client node 104 and a host node 106 communicating via a network 112. Network monitor system 102 does not have access to decryption information for decrypting messages exchanged via network 112.

Network monitor system 102 estimates network latency and round-trip time (RTT) of network traffic transported using an encrypted transport protocol based on interception data about packets intercepted by a mid-network probe. Based on the intercepted information, network monitor system 102 takes opportunistic measurements to estimate latency in each direction at the start and end of traffic bursts that typically occur throughout the lifetime of a network flow. Network monitor system 102 infers semantics about specific packets and relationships between different packets based on observable properties of these packets. Observable properties include size and timing relative to other packets within the network flow, using heuristic classification of packets, e.g., ACK Only (including an acknowledgement without any data), Data (including data), and Control (including control information). Heuristic classification of packets for inferencing packet type is described in U.S. Pat. No. 10,122,606, assigned to NetScout Systems, Inc. of Westford, Mass., which is incorporated herein in its entirety.

Network monitor system 102 monitors network traffic flowing within, to, and/or from network 112. Network traffic can flow between endpoints including a client node 104 and a host node 106. The client node 104 and host node 106 are connected to network 112 via wired and/or wireless communications links 120. Network components 114 of network 112 are connected via internal links 122. More specifically, network monitor system 102 monitors traffic flowing along internal links 122 and/or communication links 120 to monitor network flows between the endpoints for measuring latency throughout the lifetime of the network flow. The network flow can refer to, for example, the streaming of a video package (e.g., a movie), an audio package (e.g., a song, album, or playlist), a social media interaction from a start point to a finish point, a video or audio conference with two or more participants, a shopping session, a banking session, etc. The network flow can use one or more netflows. A netflow can be defined, for example, as a tuple, such as a network 5-tuple of source and destination internet protocol (IP) addresses, source and destination ports, and network protocol.

Network 112 can include one or more local area networks (LANs) and/or one or more wide area networks (WANs). Each client node 104 and host node 106 can be a computing device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets.

Network monitor system 102 includes intercept devices 108 and network monitor 110. Intercept devices 108 are central or distributed elements devices that actively or passively intercept the network traffic. Intercept devices 108 include software, firmware, and/or hardware components, such as taps, probes, or port mirrors. Intercept devices 108 can be positioned inline, and/or remote relative to internal links 122 and/or communication links 120. Intercept devices 108 are mid-network intercept devices, meaning they are associated with network monitor system 102 that monitors internal links and/or communication links 120.

Network monitor 110 receives interception data about packets intercepted from the network traffic by intercept devices 108. The intercept data includes the packets (all or some of which may be encrypted) and a time stamp indicating a time at which the packet was observed.

Figure 2:
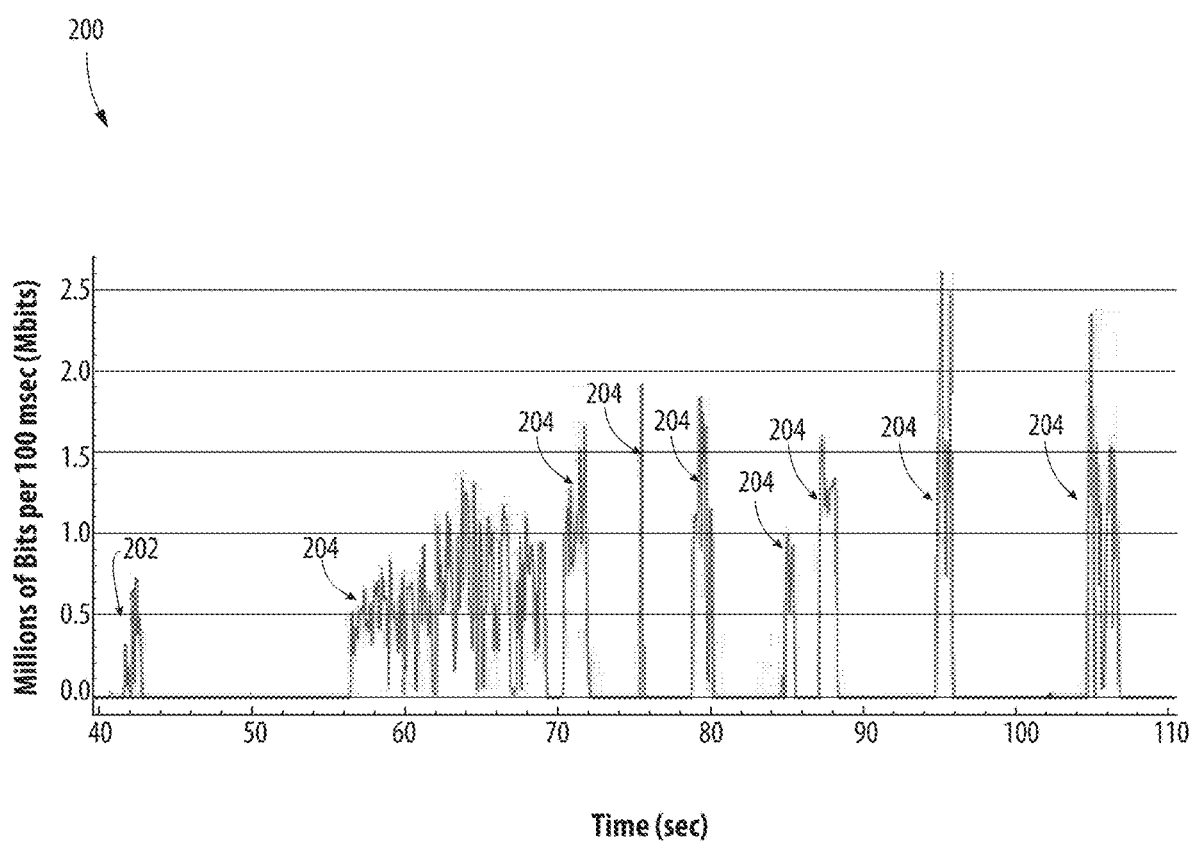
FIG. 2 is an example plot showing a traffic profile for a single QUIC long-lived network flow for streaming a video provided by an over-the top video provider.

Network monitor 110 includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. Network monitor 110 can be implemented as one or more physical or virtual devices. Whether implemented as physical or virtual device(s), network monitor 110 uses a local or remote hardware processing device that executes software instructions, which enables performance of the disclosed functions. In one or more embodiments, portions of network monitor 110 can be in the cloud (e.g., connected to the Internet (e.g., network 112)). With reference to FIG. 2, a plot 200 of a traffic profile is shown for a single QUIC long-lived network flow for streaming a video provided by an over-the top video provider, such as YouTube™ or Netflix™ (operating a host node, such as host node 106, shown in FIG. 1), to a user (operating a client node, such as client node 104, shown in FIG. 1) via a network (such as network 112 shown in FIG. 1). A vertical axis of plot 200 shows traffic rate in bits per 100 milliseconds and a horizontal axis shows time. The traffic profile demonstrates a pattern of repeated idle/burst cycles that is typical for OTT video network traffic. Initial measurements can only be obtained during a handshake phase 202 performed to initiate the network flow. Once the network flow is initiated, mid-flow measurements are obtained opportunistically each time a burst of traffic is detected after an idle interval. The idle intervals occur presumably when the host node has satisfied all outstanding requests from the client node for content. A traffic burst occurs presumably when network traffic resumes, beginning with a new client request from the client node.

A client request and subsequent response from the host node are referred to as a "transaction." However, when an encrypted transport protocol is used, a network monitor using the disclosed method (such as network monitor 110 shown in FIG. 1) cannot know with certainty that each traffic burst is a complete transaction. Rather, the network monitor infers transactions based on a specific traffic pattern. Transactions that are inferred by the network monitor are referred to as "inferred transactions," and are designated by reference numeral 204.

An inferred transaction 204 is inferred when an idle interval is followed by a traffic burst, which implies an occurrence of a client request. The inferred transactions 204 are used by the network monitor to estimate metrics, such as network latency and RTT. When the network has been idle, it can be inferred, in some cases, that the client node has initiated a new transaction via a client request, and that the subsequent response from the host node is a direct response to this particular client request from the client node, signifying the beginning of a new burst.

Cases in which initiation of a new transaction can be inferred include, for example, when the network has been idle for a significant duration and this idle period is ended by a packet from the client node that matches characteristics of a request packet (e.g., the packet's size is in a specific range of sizes, for example and without limitation, 200 to 1200 bytes). The "significant duration" of the idle period can be defined as M milliseconds from any client packets (wherein client packet refers to a packet from the client node) and N milliseconds from any server packets (wherein server packet refers to a packet from the server node). M and N can be the same or different. Example values can be (without limitation) M=50 and N=200. The values of M and N can be variable, such as based on recent latency measurements (e.g., some multiple of a recent latency measurement. In one example, when the average latency to the client node in recent measurements is 10 milliseconds, M can be 5 times the recent average latency value (which would be 50 milliseconds).

Similarly, an end of the transaction can be inferred based on inference of a final data packet from the host node and inference of final ACK of the final data packet by the client node, signifying the end of a burst. The final data packet and final ACK are followed by an idle interval of significant duration (which can be the same or different than the significant duration of the idle period that preceded the burst). The final data packet is further inferred based on the final data packet matching characteristics of a data packet. The final ACK is further inferred based on the final ACK matching characteristics of an ACK packet. In accordance with the disclosed method, measurements are obtained at the beginning of a detected traffic burst rather than in the middle of a traffic burst, since accurate inferences about any packet from the host node sent in response to a specific packet from the client node would be unknown in the middle of a traffic burst.

The disclosed method can be applied to any transport protocol, including non-encrypted transport protocols. It is noted that the disclosed method can applied for obtaining analogous metrics for traffic transported using both encrypted and non-encrypted transport protocols. While it is understood that the network traffic transported using non-encrypted protocols can be measured by obtaining more frequent and/or more accurate measurements of latency and RTT, by using the disclosed method to obtain analogous measurements for both traffic transported using both encrypted and traffic transported using non-encrypted transport protocols, fair and direct comparisons can be made between latency and RTT of traffic transported using different protocols.

Figure 3:
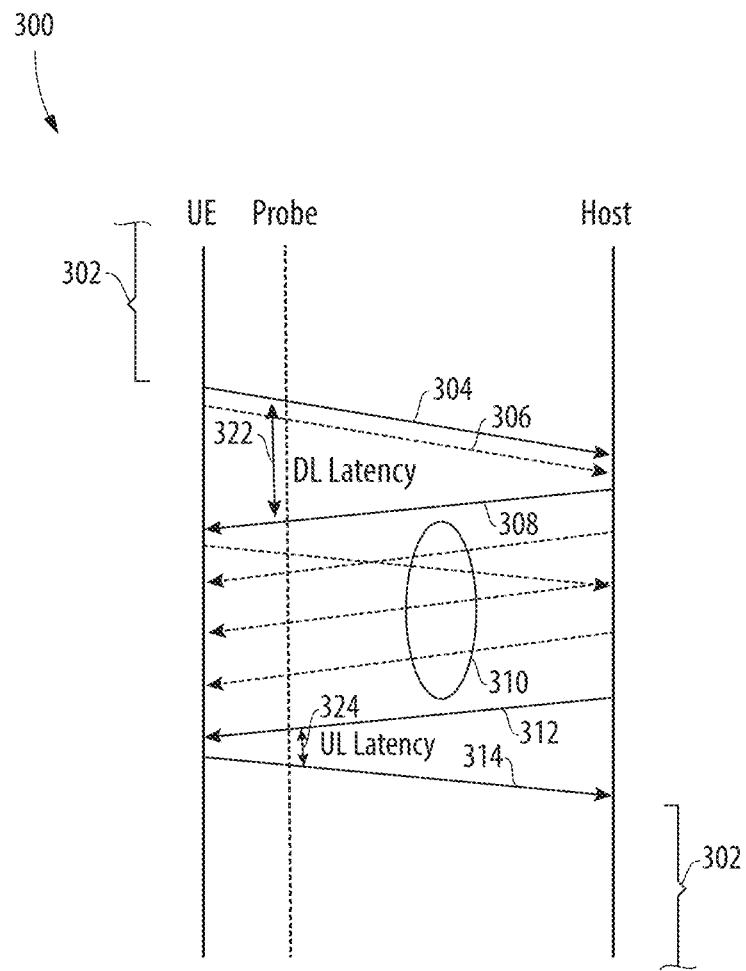
FIG. 3 is an example communication flow diagram showing communication between a user equipment and a host and application of a method of measuring download (DL) latency and/or upload (UL) latency, in accordance with an aspect of the disclosure.

FIG. 3 is a communication flow diagram 300 showing communication between a user equipment (UE) 303 and a host 305 and application of an example method of measuring download (DL) latency 322 and/or upload (UL) latency 324. Either or both of DL latency 322 and UL latency 324 can be determined, and if both are determined, they can be determined independently of one another. Determination of each of DL latency 322 and UL latency 324 uses identification of an idle interval 302.

DL latency 322 refers to a time interval from an intercept device, such as probe 301, intercepting an inferred request packet 304 from a client node, such as UE 303 to a host node, such as host 305 until interception by probe 301 of a first host response 308 after the inferred request packet 304. The first host response 308 is a packet from host 305 that follows inferred request packet 304 and is inferred to be an acknowledgement (ACK) or data packet. Example criteria for inferring that a packet has a packet type of ACK or data is described in U.S. Pat. No. 10,122,606, previously incorporated by reference, herein.

In one or more embodiments, the first host response 308 is further determined to have a particular size range deemed to be the size of a possible response. The size range for a possible response can vary based on configuration and/or the application to which the packet belongs, e.g., YouTube™, Netflix™, etc.

Identification of a first idle interval 302 is the basis for inference that a packet from the EU 303 is the inferred request packet 304 followed by a first host response 308. The identified first idle interval 302 prior to the inferred request packet 304 is also the basis for an inference that the first host response 308 from host 305 is specifically in response to new traffic from EU 303, and not some prior outstanding request.

The inferred request packet 304 is identified as being a first communication from UE 303 following the first idle interval 302 that has characteristics of a request, is a packet from the client, follows the inferred idle period in which no packets are in flight between UE 303 and host 305, and is inferred to be a data packet. Example criteria for inferring that a packet has a packet type of data is described in U.S. Pat. No. 10,122,606, previously incorporated herein by reference.

In one or more embodiments, the inferred request packet 304 is further determined to have a particular size range deemed to be the size of a possible request (e.g., 200 to 1200 bytes, without limitation). The size range for a possible request can vary based on configuration and/or the application to which the packet belongs, e.g., YouTube™, Netflix™, etc. The inferred request packet 304 indicates the beginning of a burst 326. After inferred request packet 304 is identified, any additional data packets 306 from UE 303 that are intercepted by probe 301 can be ignored until the end of burst 326.

The end of burst 326 is detected by identifying a second idle interval 302, such that burst 326 is sandwiched between the first and second idle intervals 302. The last exchange between host 305 and UE 303 before the second idle interval 302 signify the end of burst 326. Two-way traffic 310 between UE 303 and host 305 in between first host response 308 and the last exchange can be ignored.

UL latency 324 refers to a time interval from probe 301 intercepting a last inferred data packet 312 from host 305 to UE 303 to a last inferred ACK packet 314 from UE 303 in burst 326. Identification of the second idle interval 302 is the basis for an inference that permits an inference that a packet from the host 305 is the last inferred data packet 312 followed by a last inferred ACK packet from the EU 303. In other words, the packet is identified as being the last data packet sent from host 305 prior to the last inferred ACK packet 314 from UE 303 of burst 326, wherein the packet satisfies data packet criteria (e.g., packet size criteria).

The last inferred data packet 312 is identified as being a last packet from host 305 before second idle interval 302 that has characteristics of being a potential data packet, is followed by one or more ACK packets from UE 303. In one or more embodiments, in the context of determining the last inferred data packet 312, determining that the packet is not inferred to be a packet having packet type "ACK Only," is sufficient for determining that the packet has characteristics of being a potential data packet. Example criteria for inferring that a packet does not have a packet type of "ACK only" is described in U.S. Pat. No. 10,122,606, previously incorporated herein by reference.

In order for a packet to be deemed the last inferred ACK packet 314, the packet is identified as being the last ACK packet in burst 326 from UE 303 that is followed immediately by the identified second idle interval 302, and is observed within some reasonable limit of time after last inferred data packet 312 (e.g., 500 ms, without limitation). In one or more embodiments, in the context of determining the last inferred ACK packet 314, determining that the packet is not inferred to be a packet having packet type "Data," is sufficient for determining that the packet has characteristics of being a potential ACK packet. Example criteria for inferring that a packet does not have a packet type of "Data" is described in U.S. Pat. No. 10,122,606, previously incorporated herein by reference. Accordingly, identification of the second idle interval 302 is the basis for an inference that the last inferred ACK packet 314 from EU 303 is specifically in response to the last inferred data packet 312 from host 305 in burst 326.

It is possible that there are cases in which the last inferred ACK packet 314 is delayed by a small amount due to an algorithm executed by EU 303 using "deferred acking" in which EU 303 waits for multiple packets to be acknowledged by an ACK packet at once).

An RTT for the network flow can be estimated as a sum of DL latency 322 and UL latency 324.

In one or more embodiments, identification of the first and second idle intervals 302 can include identifying an interval having a duration that satisfies an idle interval criteria that is followed by an inferred request packet 304. In one or more embodiments, this criterion can be dispensed with under certain conditions, such has when the idle interval 302 is very long (e.g., >n seconds, without limitation). The interval criteria is computed using heuristics in order to provide high confidence that an interval of idleness is indeed an idle interval 302. One example of such a heuristic is setting a minimum idle duration criteria for the interval criteria to equal one second, and a requirement that the idle period be followed by a packet from UE 303 having a packet size larger than a typical ACK packet, but smaller than a typical maximum transmission unit (MTU) (e.g., wherein a typical MTU is between 200-1200 bytes). In another example, the minimum idle duration criteria is set to be some multiple of a previously estimated RTT value for the network flow (e.g., five times the most recently determined RTT value).

Figure 4:
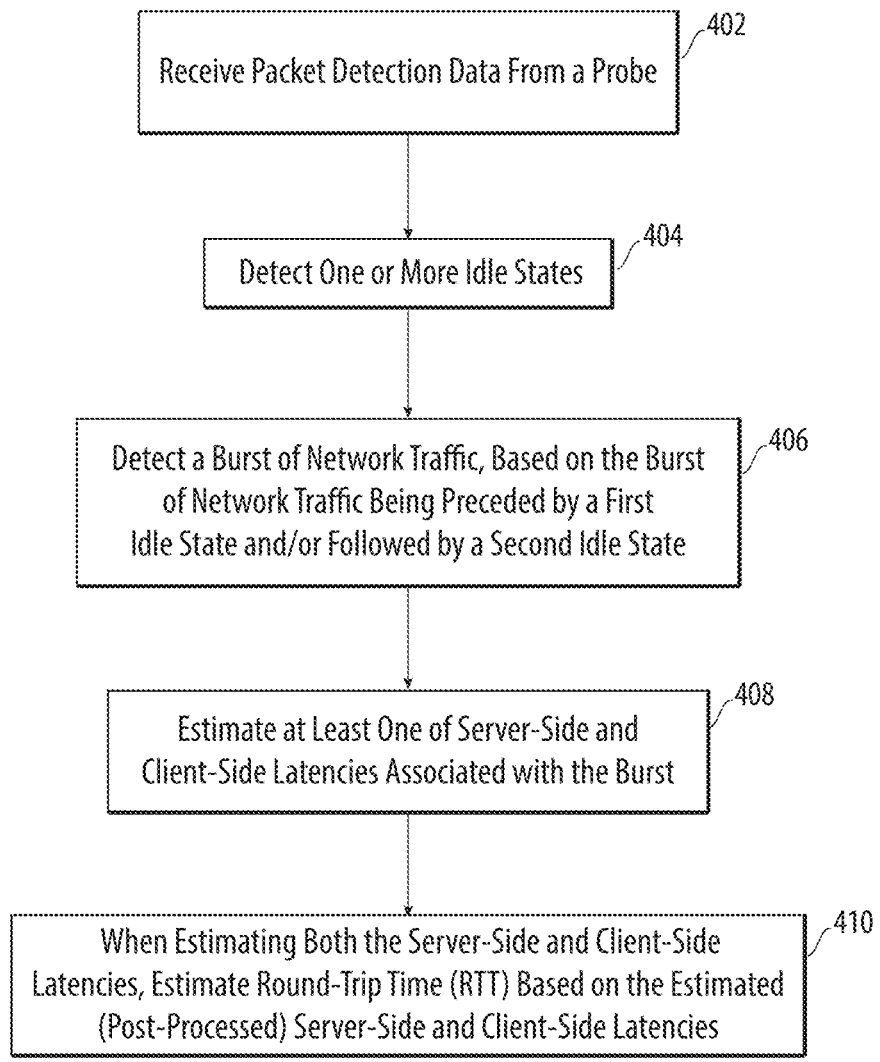
FIG. 4 is an example flowchart showing an example method of estimating network latency in network traffic between a client node and a host node of a network, in accordance with an aspect of the disclosure.

With reference now to FIG. 4, shown is a flowchart demonstrating implementation of the various exemplary embodiments. It is noted that the order of operations shown in FIG. 4 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between devices or modules can be exchanged by a transmission between the devices or modules, or can include one device or module storing the data in a location that can be accessed by the other device or module.

FIG. 4 shows a flowchart 400 of operations performed by a network monitor, such as network monitor system 102 shown in FIG. 1, for determining DL and/or UL latencies associated with communication between endpoints of a network flow. The endpoints are an example client node (such as client node 104 shown in FIG. 1) and an example host node (such as host node 106 shown in FIG. 1). The method starts at block 402 at which intercept data about data flowing between the endpoints and intercepted by an intercept device is received.

At block 404, one or more idle intervals are detected. Detection of the idle intervals is based on at least one of a duration of network traffic being idle satisfying a duration condition and a size of a first packet upon resumption of the network traffic after being idle satisfying a size condition. In one or more embodiments, the duration condition can be based on exceeding a user-selectable length or a length that is a function of one or more previously determined RTTs.

At block 406, a burst of network traffic is detected. Detecting the burst of network traffic is based on the burst of network traffic being preceded by a first idle interval and/or followed by a second idle interval.

At block 408, at least one of DL and UL latencies associated with the burst are estimated. DL latency is estimated to be an amount of time from observation of an inferred first request of the burst from the client node until observation of a first response from the host node following the inferred first request. In one or more embodiments, the first inferred request is the first packet of resumed network traffic following the first idle interval. In one or more embodiments, the first response from the host node is a packet that is an inferred ACK packet or an inferred data packet.

UL latency is estimated to be an amount of time between observations of an inferred second request of the burst from the host node to the client node until observation of an inferred second response from the client node following the inferred second request from the host node. The inferred second request is the last packet of the burst from the client node that is inferred to be an ACK packet. The inferred second response is a packet from the host node that immediately precedes the inferred second response and is inferred to trigger the inferred second response.

In one or more embodiments, when estimating both the DL and UL latencies, estimate RTT is based on the estimated DL and UL latencies. The estimated DL and UL latencies can be post-processed before determining RTT.

Regarding post-processing, since the described method of taking latency measurements relies on heuristics, it is expected that there can occasionally be some spurious measurements. This might occur, for example, if packets are lost (without the intercept device being aware of the loss), if there is an incorrect inference about an idle period, if an ACK packet is delayed for efficiency of the protocol, or if there is a significant application processing delay on the host side prior to the host node sending its response to an inferred request. Although application delays can be very small compared to network latency, there may be cases in which there is an unusually large delay associated with the host node's processing of the request. This large delay can result in a large server-side latency measurement that is not caused by the network, but is caused by the host node itself. Therefore, intelligent post-processing of a series of latency measurements is included as a final step in the algorithm, prior to publishing the reported values.

In one example, the post-processing includes filtering, such as to exclude largest and smallest values in a window of time. Another post-processing technique can include binning measurements of UL latency over a recent period of time (e.g., for the last minute or last several minutes). If there were a bimodal distribution of these measurements, for example, many measurements that were around 10 ms, and others that were around 25 ms, the post-processing can include forming an assumption that the 25 ms measurements were due to some of the ACK packets being delayed by about 15 ms), which can be factored in for determining whether the client node is exhibiting delayed ACK behavior with a specific value (e.g., 15 ms) and adjusting the relevant raw measurements based on this inferred value.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
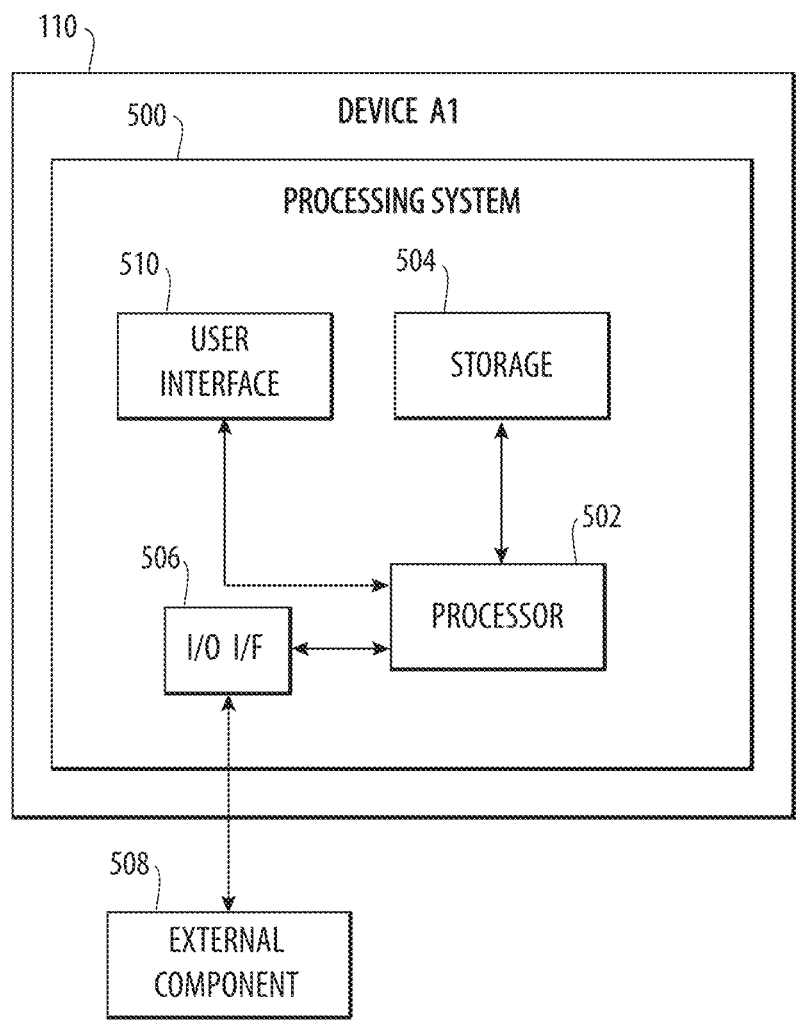
FIG. 5 illustrates an example computing system that could be used to implement a network monitor of a network protection system.

With reference to FIG. 5, a block diagram of an example computing system 500 is shown, which provides an example configuration of network monitor 110 (shown as device A1). Additionally, all or portions of the network monitor 110 could be configured as software, and computing system 500 could represent such portions. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure. Computing system 500 is shown in the form of a general-purpose computing device.

Computing system 500 includes a processing device 502, memory 504, an input/output (I/O) interface (I/F) 506 that can communicate with an internal component, such as a user interface 510, and optionally an external component 508.

The processing device 502 can include, for example, a programmable logic device (PLD), microprocessor, DSP, a microcontroller, an FPGA, an ASIC, and/or other discrete or integrated logic circuitry having similar processing capabilities.

The processing device 502 and the memory 504 can be included in components provided in the FPGA, ASIC, microcontroller, or microprocessor, for example. Memory 504 can include, for example, volatile and non-volatile memory for storing data temporarily or long term, and for storing programmable instructions executable by the processing device 502. Memory 504 can be a removable (e.g., portable) memory for storage of program instructions. I/O I/F 506 can include an interface and/or conductors to couple to the one or more internal components 510 and/or external components 508.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of network monitor 110 may be implemented or executed by one or more computer systems, such as a microprocessor. Each computer system 500 can be included within processing components of network monitor 110, or multiple instances thereof. In various embodiments, computer system 500 may include one or more of a microprocessor, an FPGA, application specific integrated circuit (ASIC), microcontroller. The computer system 500 can be provided as an embedded device. Portions of the computer system 500 can be provided externally, such by way of a virtual, centralized, and/or cloud-based computer.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method of estimating network latency in long-lived network flows of network traffic between a client node and a host node of a network, the method comprising:
   receiving intercept data from an intercept device, the intercept data representing observations of one or more requests sent by the client node and one or more responses to the respective requests from the host node;
   detecting a burst of network traffic that occurred anywhere in the middle of a long-lived network flow that is sandwiched between a first idle interval and a second idle interval, wherein detecting the burst of network traffic includes detecting a beginning of the burst of network traffic based on the burst of network traffic being preceded by the first idle interval and detecting an ending of the burst of network traffic based on the burst of network traffic being followed by the second idle interval; and
   estimating download (DL) and upload (UL) latencies associated with the respective beginning and ending of the burst, wherein the DL latency is estimated to be an amount of time between observation of a first inferred request of the burst from the client node until observation of a first inferred response from the host node following the first inferred request, wherein the first inferred request of the burst from the client node is the first packet following the first idle interval, and the UL latency is estimated to be an amount of time between observation of a last inferred data packet of the burst from the host node to the client node until observation of a last inferred packet from the client node following the last inferred data packet from the host node, wherein the last inferred data packet of the burst from host node is the last packet before the second idle interval from the host, and the last inferred data packet is inferred at least based on the last inferred data packet matching characteristics of a data packet, which is as opposed to matching characteristics of an acknowledgement (ACK) packet that does not include a data payload.

2. The method of claim 1, wherein the method further comprising estimating round-trip time (RTT) based on the estimated DL and UL latencies.

3. The method of claim 2, further comprising detecting the first and second idle intervals based on at least one of a duration of network traffic being idle satisfying a duration condition and a size of a first packet upon resumption of the network traffic after being idle satisfying a size condition.

4. The method of claim 3, wherein the duration condition is based on exceeding a user-selectable duration or a duration that is a function of one or more previously determined RTTs.

5. The method of claim 1, wherein the first inferred request is the first packet of resumed network traffic following the first idle interval.

6. The method of claim 1, wherein the first inferred response is a first inferred ACK packet or a first inferred data packet following the first inferred request.

7. The method of claim 1, wherein the last inferred packet is the last packet of the burst from the client node that is inferred to be an ACK packet.

8. The method of claim 7, wherein the last inferred data packet is a packet from the host node that immediately precedes the last inferred packet and is inferred to trigger the last inferred packet.

9. The method of claim 2, further comprising post-processing the estimated DL and/or UL latencies, comprising at least one of:
   filtering the estimated DL and/or UL latencies based on their relative size; and
   estimating a delay by which ACK packets are consistently delayed and adjusting the estimation of the DL and/or UL latencies to compensate for the estimated delay.

10. A computer system for estimating network latency in long-lived network flows of network traffic between a client node and a host node of a network, comprising:
   a memory configured to store instructions;
   processor disposed in communication with said memory, wherein the processor, upon execution of the instructions, is configured to:
   receive intercept data from an intercept device, the intercept data representing observations of one or more requests sent by the client node and one or more responses to the respective requests from the host node;
   detect a burst of network traffic that occurred anywhere in the middle of a long-lived network flow that is sandwiched between a first idle interval and a second idle interval, wherein detecting the burst of network traffic includes detecting a beginning of the burst of network traffic based on the burst of network traffic being preceded by the first idle interval and detecting an ending of the burst of network traffic based on the burst of network traffic being followed by the second idle interval; and
   estimate download (DL) and upload (UL) latencies associated with the respective beginning and ending of the burst, wherein the DL latency is estimated to be an amount of time between observation of a first inferred request of the burst from the client node until observation of a first response from the host node following the first inferred request, wherein the first inferred request of the burst from the client node is the first packet following the first idle interval, and the UL latency is estimated to be an amount of time between observation of a last inferred data packet of the burst from the host node to the client node until observation of a last inferred packet from the client node following the last inferred data packet from the host node, wherein the last inferred data packet of the burst from host node is the last packet before the second idle interval from the host, and the last inferred data packet is inferred at least based on the last inferred data packet matching characteristics of a data packet, which is as opposed to matching characteristics of an acknowledgement (ACK) packet that does not include a data payload.

11. The computer system of claim 10, wherein the processor, upon execution of the instructions, is further configured to estimate round-trip time (RTT) based on the estimated DL and UL latencies.

12. The computer system of claim 11, wherein the processor, upon execution of the instructions, is further configured to detect the first and second idle intervals based on at least one of a duration of network traffic being idle satisfying a duration condition and a size of a first packet upon resumption of the network traffic after being idle satisfying a size condition.

13. The computer system of claim 12, wherein the duration condition is based on exceeding a user-selectable duration or a duration that is a function of one or more previously determined RTTs.

14. The computer system of claim 10, wherein the first inferred request is the first packet of resumed network traffic following the first idle interval.

15. The computer system of claim 10, wherein the first inferred response is a first inferred ACK packet or inferred data packet following the first inferred request.

16. The computer system of claim 10, wherein the last inferred packet is the last packet of the burst from the client node that is inferred to be an ACK packet.

17. The computer system of claim 16, wherein the last inferred data packet is a packet from the host node that immediately precedes the last inferred packet and is inferred to trigger the last inferred packet.

18. The computer system of claim 11, wherein the processor, upon execution of the instructions, is further configured to post-process the estimated DL and/or UL latencies, comprising at least one of:
    filtering the estimated DL and/or UL latencies based on their relative size; and
    estimating a delay by which ACK packets are consistently delayed and adjusting the estimation of the DL and/or UL latencies to compensate for the estimated delay.

19. A non-transitory computer readable storage medium and one or more computer programs embedded therein, the computer programs comprising instructions, which when executed by a computer system, cause the computer system to:
    receive intercept data from an intercept device, the intercept data representing observations of one or more requests sent by the client node and one or more responses to the respective requests from the host node;
    detect a burst of network traffic that occurred anywhere in the middle of a long-lived network flow that is sandwiched between a first idle interval and a second idle interval, wherein detecting the burst of network traffic includes detecting a beginning of the burst of network traffic based on the burst of network traffic being preceded by the first idle interval and detecting an ending of the burst of network traffic based on the burst of network traffic being followed by the second idle interval; and
    estimate download (DL) and upload (UL) latencies associated with the respective beginning and ending of the burst, wherein the DL latency is estimated to be an amount of time between observation of a first inferred request of the burst from the client node until observation of a first response from the host node following the first inferred request, wherein the first inferred request of the burst from the client node is the first packet following the first idle interval, and the UL latency is estimated to be an amount of time between observation of a last inferred data packet of the burst from the host node to the client node until observation of a last inferred packet from the client node following the last inferred data packet from the host node, wherein the last inferred data packet of the burst from host node is the last packet before the second idle interval from the host, and the last inferred data packet is inferred at least based on the last inferred data packet matching characteristics of a data packet, which is as opposed to matching characteristics of an acknowledgement (ACK) packet that does not include a data payload.

20. The non-transitory computer readable storage medium of claim 19, wherein:
    the first inferred request is the first packet of resumed network traffic following the first idle interval, and the first inferred response is a first inferred acknowledgement (ACK) packet or a first inferred data packet following the first inferred request; and/or
    the last inferred packet is the last packet of the burst from the client node that is inferred to be an acknowledgement (ACK) packet, and the last inferred data packet is a packet from the host node that immediately precedes the last inferred packet and is inferred to trigger the last inferred packet.

* * * * *